United States Patent [19]
Costin et al.

[11] Patent Number: 6,125,979
[45] Date of Patent: *Oct. 3, 2000

[54] RATCHET ONE-WAY CLUTCH ASSEMBLY WITH RESTRAINING MEMBERS

[75] Inventors: Daniel P. Costin, Naperville; James R. Papania, Bolingbrook, both of Ill.; Duane A. Bacon, Saline, Mich.

[73] Assignee: BorgWagner Inc., Troy, Mich.

[ * ] Notice: This patent is subject to a terminal disclaimer.

[21] Appl. No.: 09/258,426

[22] Filed: Feb. 26, 1999

Related U.S. Application Data

[63] Continuation-in-part of application No. 09/033,451, Mar. 2, 1998, Pat. No. 5,971,122, which is a continuation-in-part of application No. 08/917,880, Aug. 27, 1997, Pat. No. 5,947,245, which is a continuation-in-part of application No. 08/707,104, Sep. 3, 1996, Pat. No. 5,853,073.

[51] Int. Cl.[7] .................................................. F16D 41/069
[52] U.S. Cl. .............................. 192/46; 192/69.1; 192/71; 192/103 B
[58] Field of Search ................................ 192/45.1, 46, 64, 192/69.1, 71, 72, 105 CD, 105 CF, 103 B, 108

[56] References Cited

U.S. PATENT DOCUMENTS

| | | |
|---|---|---|
| 709,900 | 9/1902 | Gurney et al. . |
| 1,767,593 | 6/1930 | Laabs . |
| 1,883,966 | 10/1932 | Krause . |
| 2,226,247 | 12/1940 | Lesage . |
| 2,323,353 | 7/1943 | Plog . |
| 2,710,504 | 6/1955 | Dodge . |
| 3,174,586 | 3/1965 | Dotter . |
| 3,486,586 | 12/1969 | Grier, Jr. . |
| 3,554,340 | 1/1971 | Shimano et al. . |
| 4,145,095 | 3/1979 | Segawa . |
| 4,154,327 | 5/1979 | Haeussinger . |
| 4,702,486 | 10/1987 | Tsuchie . |
| 5,064,037 | 11/1991 | Long, Jr. . |
| 5,065,635 | 11/1991 | Burtner et al. . |
| 5,070,978 | 12/1991 | Pires ........................................ 192/45.1 |
| 5,143,189 | 9/1992 | Meier-Burkamp . |
| 5,445,255 | 8/1995 | Rutke et al. . |
| 5,449,057 | 9/1995 | Frank . |
| 5,597,057 | 1/1997 | Ruth et al. . |
| 5,678,668 | 10/1997 | Sink .......................................... 192/46 |
| 5,690,202 | 11/1997 | Myers . |
| 5,699,889 | 12/1997 | Gadd . |
| 5,806,643 | 9/1998 | Fitz ........................................ 192/45.1 |
| 5,829,565 | 11/1998 | Fergle et al. .............................. 192/46 |
| 5,853,073 | 12/1998 | Costin ...................................... 192/46 |
| 5,855,263 | 1/1999 | Fergle . |

FOREIGN PATENT DOCUMENTS

| | | |
|---|---|---|
| 0 471 349 A1 | 2/1992 | European Pat. Off. . |
| 2 267 484 | 11/1975 | France . |
| 139 815 C1 | 2/1901 | Germany . |
| 375 047 | 5/1923 | Germany . |
| 338693 | 3/1936 | Italy . |
| 550029 | 10/1956 | Italy . |
| 2116 | 1/1907 | United Kingdom . |
| 1 598 908 | 9/1981 | United Kingdom . |

*Primary Examiner*—Richard M. Lorence
*Attorney, Agent, or Firm*—Artz & Artz; Greg Dziegielewski

[57] ABSTRACT

A ratchet one-way clutch assembly is disclosed. The assembly has an inner race with a plurality of notches, an outer race with a plurality of pockets, and a plurality of pawl members positioned in the pockets for engagement with the notches. The pawl members can have a pivot ridge to mate with a peak or recess in the pockets in the outer race to precisely position the pawl in the pocket. The pawl center of the mass can be selectively positioned such that the pawl can have a tendency to become engaged or disengaged with the notches in the inner race. Spring members can be utilized to provide tilting force on the pawl members toward engagement. Garter springs, coil springs, ribbon springs, Z-type springs, individual leaf-springs or the like can be used for this purpose. The springs can be separate or part of a cage member positioned between the inner and outer race. Retaining members for axial and radially retaining the pawls in position can also be used. The clutch assemblies can be conventional ratchet clutch assemblies with annular inner and outer race members, or planar-type ratchet clutch assemblies.

14 Claims, 14 Drawing Sheets

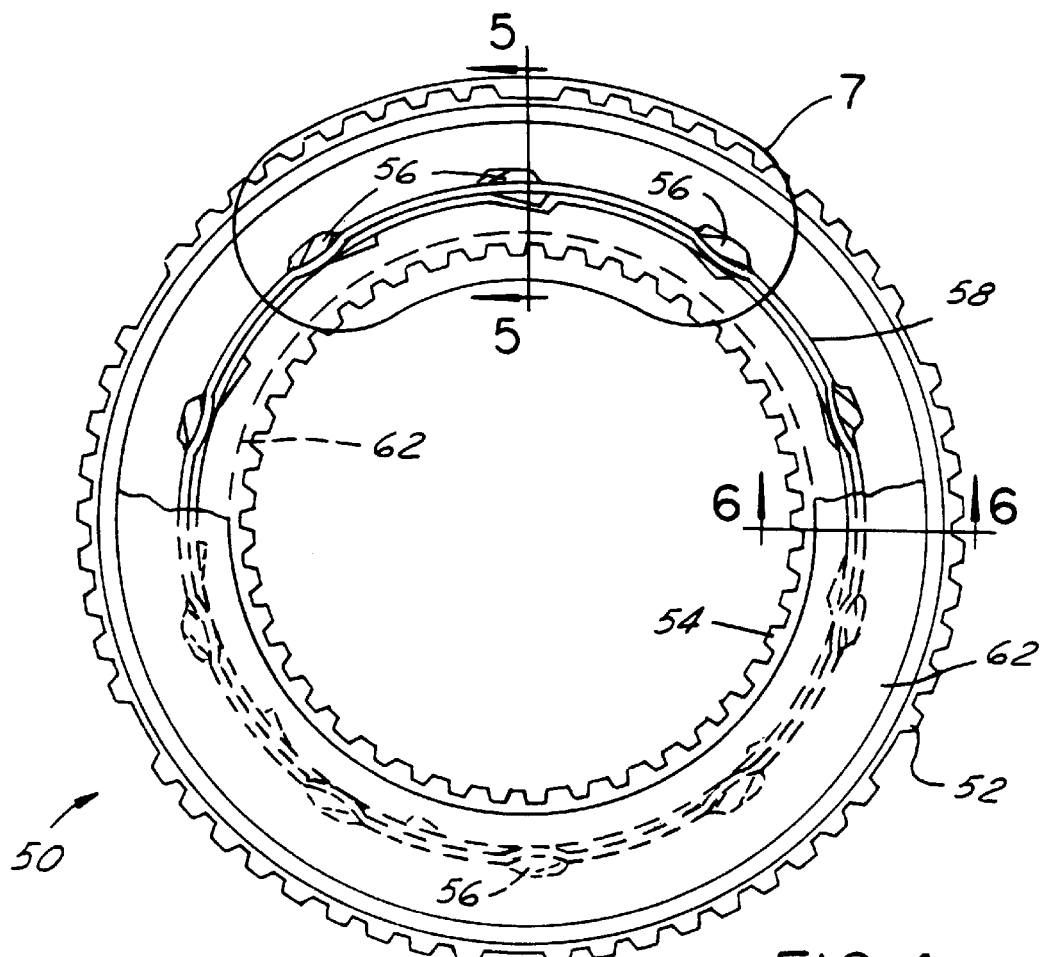
FIG. 4
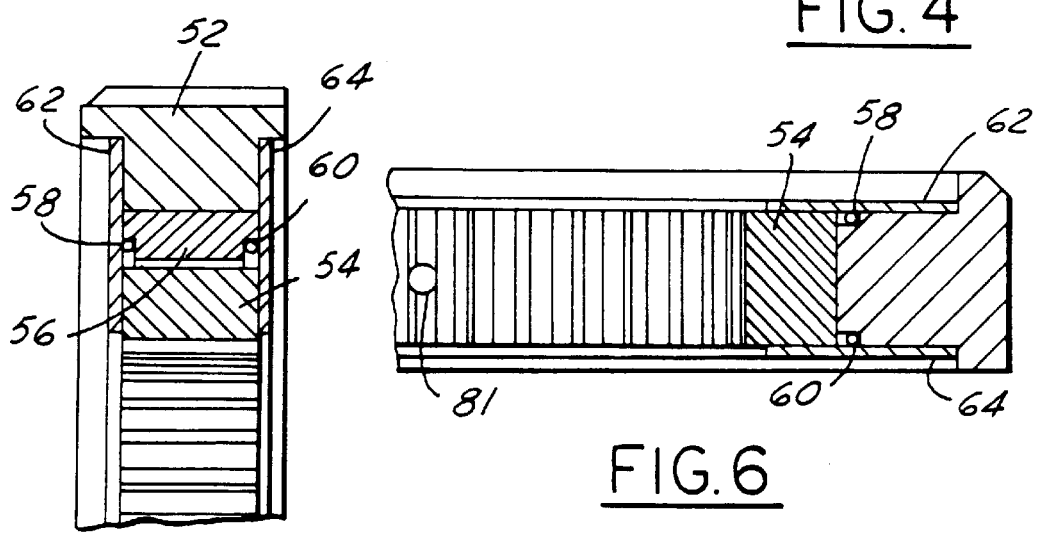
FIG. 5
FIG. 6

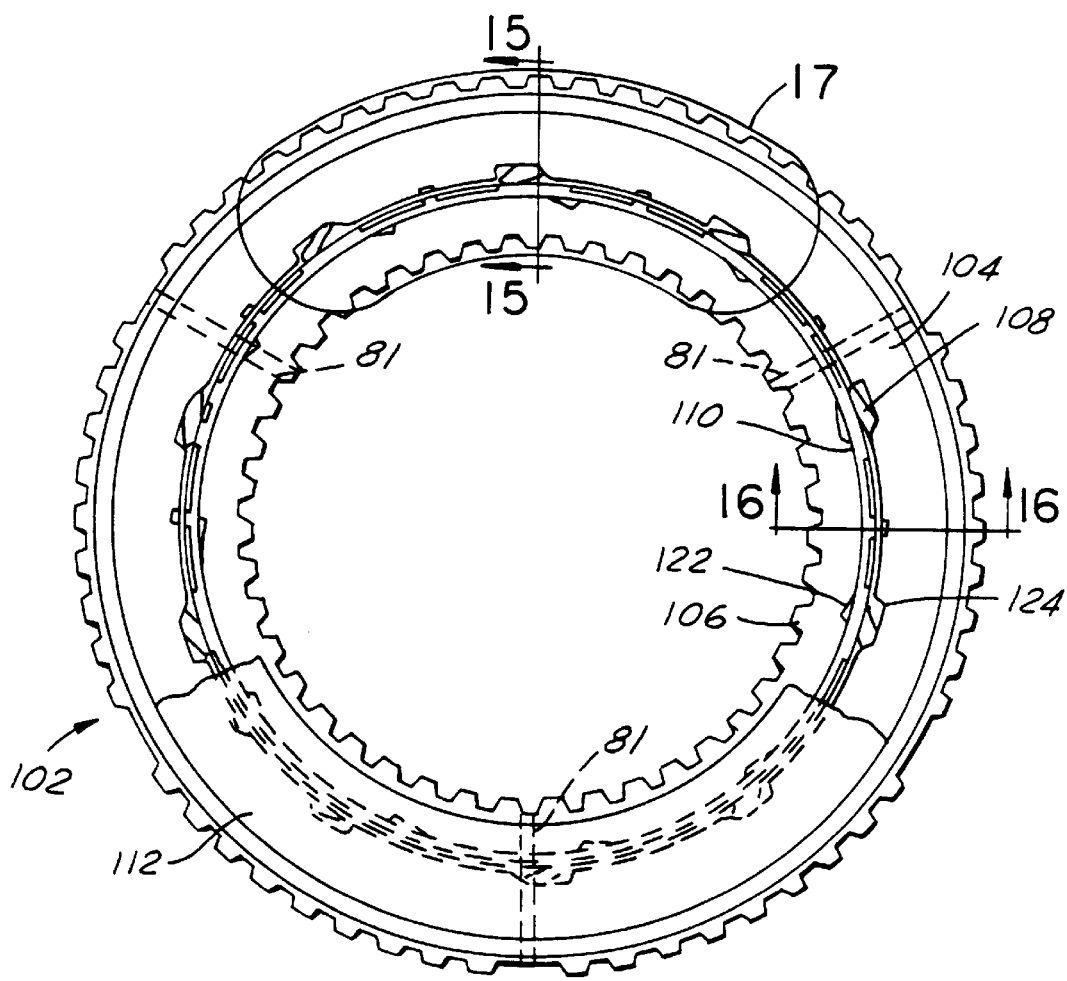
FIG.14
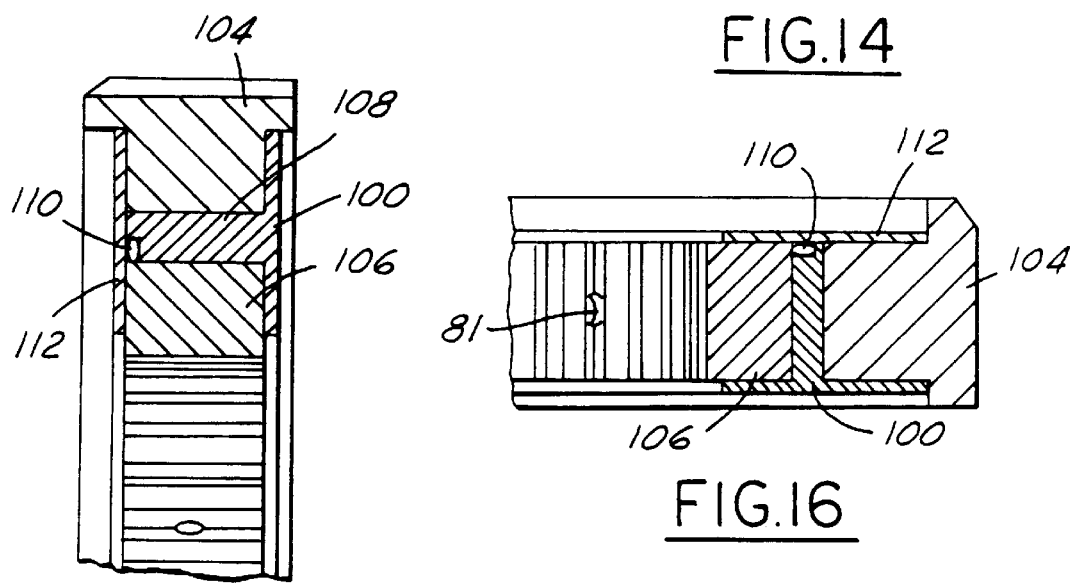
FIG.15
FIG.16

RATCHET ONE-WAY CLUTCH ASSEMBLY WITH RESTRAINING MEMBERS

CROSS-REFERENCE TO RELATED APPLICATIONS

This is a continuation-in-part of U.S. patent application Ser. No. 09/033,451, filed on Mar. 2, 1998, (now U.S. Pat. No. 5,971,122) which is a continuation in part of U.S. patent application Ser. No. 08/917,880, filed on Aug. 27, 1997, (now U.S. Pat. No. 5,947,245) which in turn is a continuation-in-part of U.S. patent application Ser. No. 08/707,104, filed on Sep. 3, 1996 (now U.S. Pat. No. 5,853,073).

TECHNICAL FIELD

The invention relates to ratchet one-way clutch assemblies with centrifugally engaging/disengaging pawl members and/or biasing means to bias the pawl members into engagement.

BACKGROUND ART

There are various types of one-way clutch assemblies in use today. Such clutch assemblies include sprag-type, roller-type, and pawl ratchet-type assemblies. All of these one-way clutch assemblies work satisfactorily depending upon the particular application in which they are used.

In certain transmissions, increased torque capacity is needed for one-way clutch assemblies. Space constraints also require that the size of the clutch assembly be retained within certain limits. Current one-way clutch assemblies with sprags or rollers are often insufficient to add increased load carrying capacity and still maintain the space constraints.

Pawl one-way clutch assemblies can add increased nominal load capacity for a given package size. The design limits of a ratchet-type pawl clutch assembly are dictated by contact stress between the pawls and the races and/or bending, shear, and hoop stresses generated within the races.

Ratchet clutch assemblies have at least one pawl which acts to lock two notched or pocketed races together in one direction and rotate freely in the other direction. In general, the differences between known ratchet clutch assemblies relate to the control of the movement of the pawls and the effect on that movement by centrifugal forces.

Ratchet clutch assemblies are shown, for example, in U.S. Pat. Nos. 2,226,247, 3,554,340, and 5,449,057. Another ratchet clutch assembly is shown in British Patent No. 2116.

It is an object of the present invention to provide an improved ratchet one-way clutch assembly. It is another object of the present invention to provide an improved ratchet clutch assembly which has improved operation at high speeds.

It is still another object of the present invention to provide a ratchet one-way clutch assembly in which the pawl members are provided with biasing and/or tilting forces toward engagement or disengagement. It is a still further object of the present invention to provide a ratchet one-way clutch assembly which utilizes spring members to place biasing forces on the pawl members toward engagement.

It is a further object of the present invention to provide a ratchet-type one-way clutch assembly embodiment in which spring or biasing members used to bias the pawl members toward engagement also assist in radially and axially restraining the pawl members and keeping them in position.

SUMMARY OF THE INVENTION

The present invention provides in one embodiment a ratchet one-way clutch assembly which includes a plurality of pawls positioned in pockets in the outer race or member of a clutch assembly. A plurality of corresponding notches with teeth are positioned on the outer circumference of the inner race or member to mate with the pawl members in locking engagement during relative rotation of the races or members in one direction. The pawl members have peaks or ridges which mate with pivot ridges or recesses in the pockets in the outer member. The center of mass of the pawl member can be situated or positioned such that when the clutch rotates the centrifugal force on the center of mass causes the pawl members to move toward their engaged or disengaged positions.

The ridge in the outer member pocket is located relative to the center of mass of the pawl member in order to control the engaging force. This assists in high speed durability.

In various embodiments of the invention, spring members, such as garter springs, coil springs, ribbon springs, Z-shaped springs, individual leaf-springs and the like are used to provide tilting or biasing forces on the pawl members toward engagement. The spring forces can be applied on one or more circumferential grooves in the pawls, or the spring forces can act on the pawl members themselves or in recesses that extend axially along the length of the pawl. The spring members can also be included as part of cage members positioned between the inner and outer races.

Other embodiments of the invention utilize one or more axial and/or radially retaining devices. The retaining devices can be part of a cage member which has one or more spring tabs or restraining arms which act on side flanges or ears of the pawl members to keep them in alignment. The retaining devices can also be separate members such as washers or plastic retainers with axial extending flange members. These devices retain the pawls axially and/or radially and also hold the races in alignment, while allowing relative rotation. End retainment devices can also act as thrust bearings and retain required lubrication to prevent excessive wear of the pawls.

Still other embodiments of the invention include planar-type ratchet clutches with spring or other biasing members used to bias the pawl members toward engagement.

The present invention ratchet one-way clutch assembly has particular use in vehicle transmissions and can be used in environments where both races rotate or where one of the races is fixed. The invention can also be used in any mechanism where a positive backstop is desired to prevent undesired reverse or backward rotation, such as in an escalator mechanism or the like.

Other features, benefits and advantages of the present invention will become apparent from the following description of the invention, when viewed in accordance with the attached drawings and appended claims.

BRIEF DESCRIPTION OF THE DRAWINGS

FIGS. 3 and 4 illustrate an alternate embodiment of the present invention which utilizes garter spring members, with FIG. 4 being an elevational view and FIG. 3 being an exploded view thereof;

FIGS. 5 and 6 show partial cross-sectional views of the embodiment shown in FIG. 4, the cross-sectional views being taken along lines 5—5 and 6—6, respectively, in FIG. 4 and in the direction of the arrows;

FIGS. 13 and 14 illustrate a still further embodiment of the present invention, with FIG. 14 being an elevational view and FIG. 13 being an exploded view thereof;

FIGS. 15 and 16 show partial cross-sectional views of the clutch assembly shown in FIG. 14, the cross-sectional views being taken along lines 15—15 and 16—16, respectively, in FIG. 14 and in the direction of the arrows;

BEST MODE(S) FOR CARRYING OUT THE INVENTION

Figure 1:
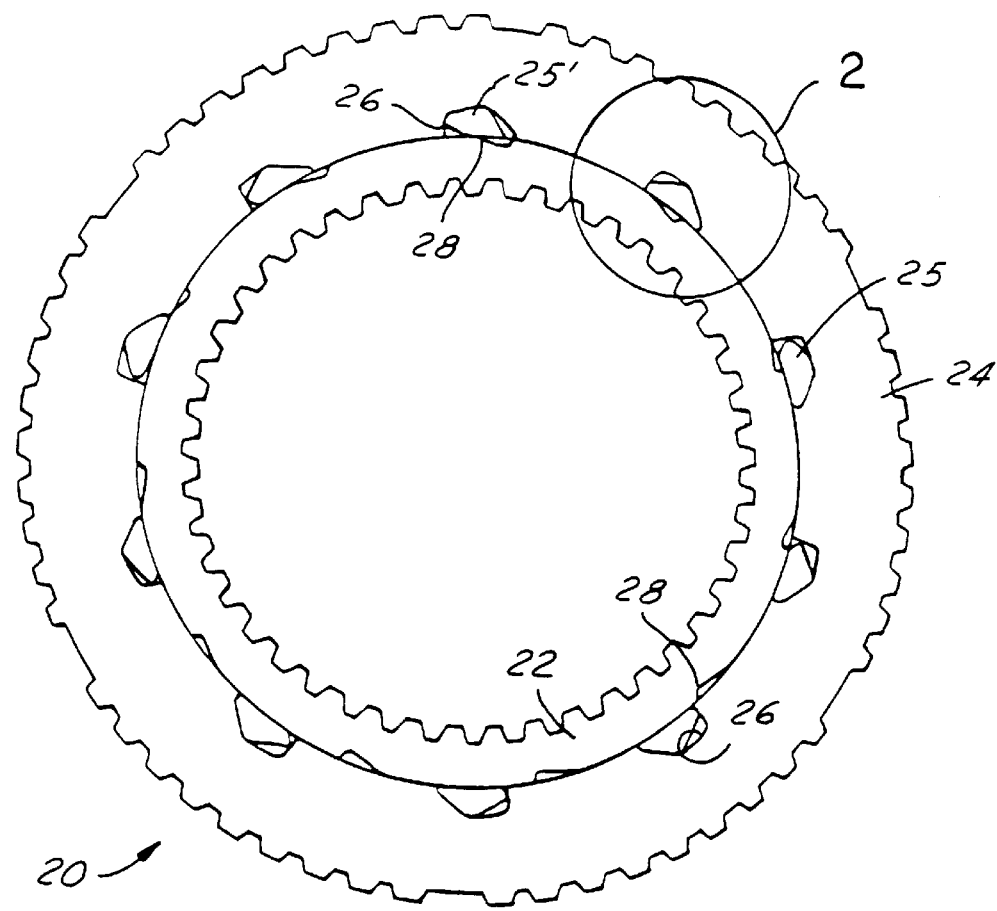
FIG. 1 illustrates a ratchet one-way clutch assembly in accordance with one embodiment of the present invention.

FIG. 1 schematically illustrates a ratchet one-way clutch assembly 20 in accordance with the present invention. The assembly 20 includes an inner race 22, an outer race 24, and a plurality of individual pawl members 25. The pawl members 25 are positioned in pockets 26 in the outer race member. A plurality of notches 28 are positioned in the outer circumference or periphery of the inner race 22.

When the motion of the inner race 22 relative to the outer race member 24 is in the clockwise direction in FIG. 1, the inner race rotates freely. When the relative motion of the inner race member 22 relative to the other race member 24 is counterclockwise, the inner race and outer race are locked together by one of the pawls 25. In this regard, in FIG. 1, the locked pawl is indicated by the reference numeral 25'. The pawl 25' transmits force through pocket 26 in the outer race and notch 28 in the inner race.

In the clutch assembly shown in FIG. 1, ten pockets 26 and ten pawl members 25 are shown, together with eleven notches 28 in the inner race 22. Although the embodiment shown in FIG. 1 only shows one pawl 25' in engagement, more than one pawl can be engaged at one time if the number of pawls and notches are both wholly divisible by a common denominator other than one.

Figure 2:
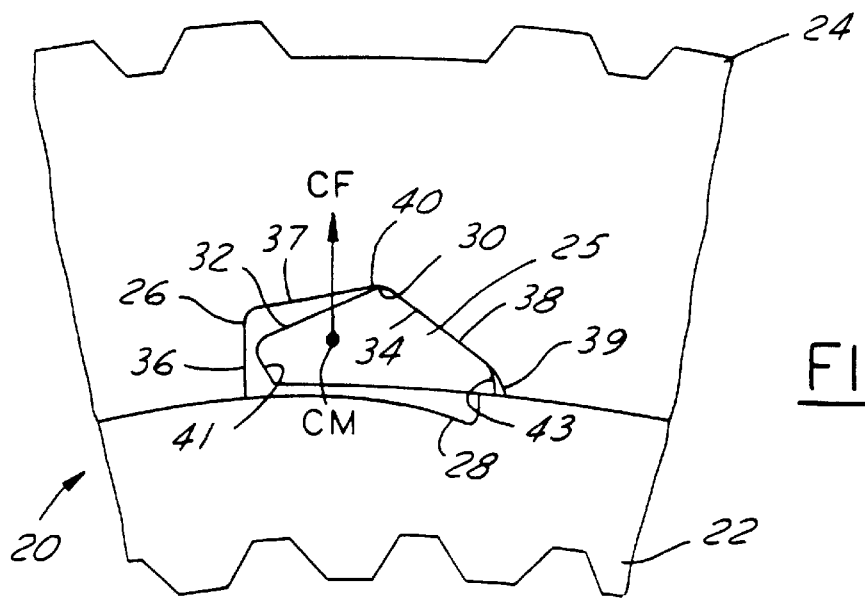
FIG. 2 is an enlarged view of a portion of the clutch assembly shown in FIG. 1.
Figure 3:
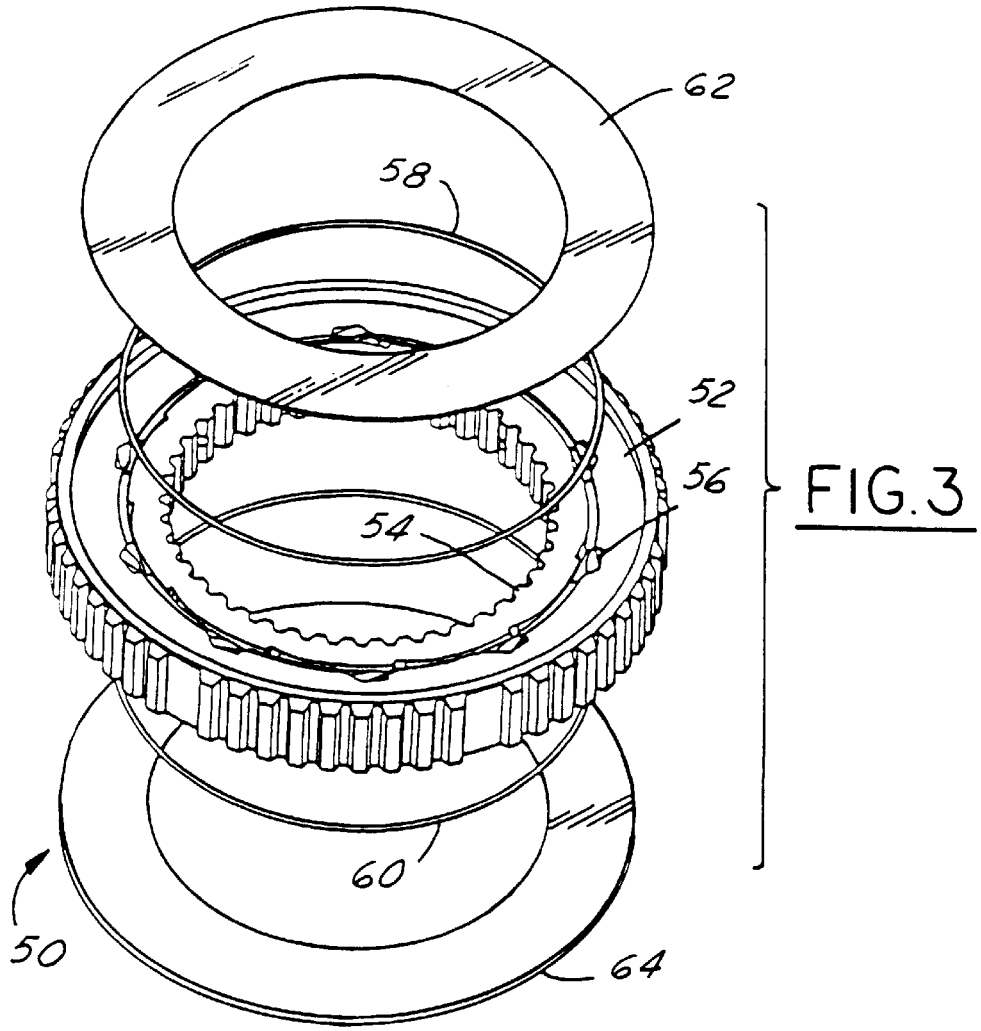

FIG. 2 is an enlarged view of a portion of the clutch assembly shown in FIG. 1. The pawl 25 shown in FIG. 2 is depicted in the free-wheeling position. In accordance with the present invention, the cross-section of the pawl 25 has a peak or pivot ridge 30 formed by the intersection of two substantially flat sides 32 and 34. The peak 30 of the cross-section forms a pivot ridge with the outer race pocket 26 which is shaped to receive the pawl. In this regard, the pocket 26 has substantially straight sides 36, 37, 38 and 39.

The pawl members can be formed so that the precise center of mass (CM) can be positioned where desired relative to the pivot ridge and thus influence or affect the operation of the clutch assembly as needed for the particular application. For example, as shown in FIG. 2, the center of mass (CM) of the pawl 25 is positioned to the left of the pivot ridge 30. In this manner, as the clutch assembly 20 rotates, a centrifugal force (CF) on the center of mass (CM) causes the pawl 25 to move toward the engaged position, that is, the position where it would be engaged with notch 28 in the inner race 22. The torque on the pawl 25 is proportional to the tangential distance of the CM away from the ridge 30.

Although the embodiment of the invention shown in FIGS. 1 and 2 shows a pawl member with the center of mass positioned, together with the pocket in the outer race, such that the pawl has a tendency to move toward the engaged position, other embodiments can be utilized in accordance with the present invention. For example, the geometry of the pawl can be changed to provide a pawl with a disengaging tendency. In this manner, the CM could be positioned to the right of the pivot ridge 30.

The pocket 26 in the outer race also has a peak or recess 40 which mates with the pivot ridge 30 of the pawl member 25. The peak 40 in the pocket holds the pawl 25 in the proper circumferential location for free movement in the pocket. This prevents the ends 42 and 43 of the pawl member 25 from coming in contact with the sides 36 and 39, respectively, of the pocket. If the ends of the pawl were to hit the adjacent areas of the outer race pocket, friction could slow the movement of the pawl toward engagement. In accordance with one preferred use of the present invention, it is desirable for the pawls to rotate into engagement with the inner race as quickly as possible.

With the present invention, the ridge on the pawl can be precisely located relative to the center of mass of the pawl, regardless of the exact location of the pawl with respect to the outer race. This allow precise control of the engaging force, which is preferred for high speed operation. This is also accomplished with a relatively simple geometry which does not include an axle, separate pivot member, or the like. Moreover, the outer race pocket is shaped such that it also has a corresponding peak or recess, which retains the pawl in a precise location in the pocket. This location prevents the pawl from contacting the sides or ends of the pocket as it rotates toward engagement.

Preferably, the pawl members 25 are made of a hardened steel material and formed by pieces cut from a drawn wire. This allows precise control of the geometry of the pawl, and also allows precise control of the center of mass relative to the peak or pivot ridge 30. In this regard, with the present invention, it is possible to control the center of mass within a tolerance of 0.001 inches.

Another embodiment of the present invention is shown in FIGS. 3–8. This embodiment is referred to generally by the reference numeral 50 in the drawings. In the one-way ratchet clutch assembly 50, a spring is used to provide a tilting force on the pawl members toward engagement. A spring is particularly needed for pawls which are disengaged centrifugally, as well as for engaging pawls that must engage when the outer race is stationary. In FIGS. 3–8, the assembly 50 includes an outer race member 52, an inner race member 54, a plurality of pawl members 56, and a pair of garter springs 58 and 60. A pair of retainment washers 62 and 64 are also provided in the embodiment shown in FIG. 3 and are discussed further below.

Figure 7:
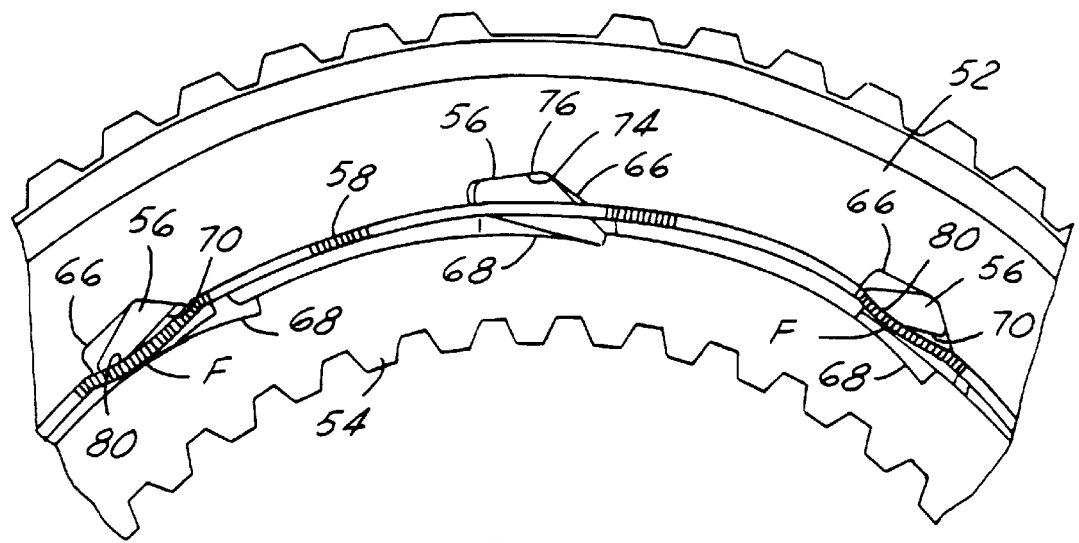
FIG. 7 is an enlarged view of a portion of the clutch assembly embodiment shown in FIG. 4.
Figures 8, 9, 10:
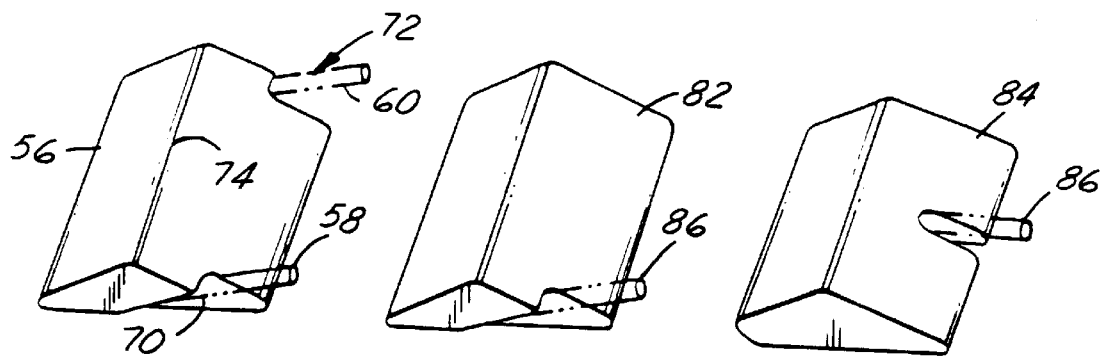
FIGS. 8, 9 and 10 illustrate various embodiments of pawl members for use with a garter spring-type embodiment of the present invention.

As shown more particularly in FIG. 7, the pawl members 56 are positioned in pockets 66 in the outer race members 52 and are adapted to engage with notches 68 in the inner race 54. The garter springs 58 and 60, only one of which is shown in FIG. 7, are made from a small coil of wire and are commonly available. For the embodiment shown in FIG. 3 which utilizes two garter springs 58 and 60, pawl member 56 is utilized as shown in FIG. 8. The pawl member 56 has a pair of recesses or side grooves 70 and 72. (The extensions on the sides of the pawls adjacent the recesses or grooves are often called "ears.") The garter springs 58 and 60 are positioned in the recesses 70 and 72 below the "ears" when the pawl members are positioned in the outer race. The remainder of the pawl members 56 have sizes and shapes similar to pawl members 25 described above with respect to FIGS. 1 and 2. In this regard, the pawl members have a pivot ridge 74 which mates with a peak or recess 76 in the pocket 66.

The operation of the spring members 58 and 60 is shown with reference to spring 58 and pawl members 56 in FIG. 7. In this regard, when the pawl members are in their disengaged position, the garter spring 58 provides a force toward outer race member and thus toward the engaging position of the pawl member. This spring provides a force F (as shown in FIG. 7) against surface 80 of each of the pawl members. When the pawl members 56 are in their engaged positions, that is, mated with notches 68 in the inner race, the spring member 58 is relaxed and does not provide a spring force on the pawl members. This is shown with respect to the center pawl member 56 in FIG. 7.

The spring force can also be arranged to act on a single side groove or a center groove of the pawl geometry. This is shown in FIGS. 9 and 10, respectively, where the pawl members are referred to by the reference numbers 82 and 84. The garter spring is indicated in phantom lines and is referred to by reference numeral 86. If either of the pawl embodiments shown in FIGS. 9 and 10 are utilized with the embodiment of the invention shown in FIGS. 3–7, then the position of the spring and the number of springs provided is adjusted accordingly.

Opening or aperture 81 in the drawings (FIG. 6) provides an access hole for lubrication relative to the transmission or other mechanism in which the one-way clutch assembly 50 is utilized. Preferably, several access holes are provided in the clutch assembly, such as the three openings 81 shown in FIG. 14.

Figure 11:
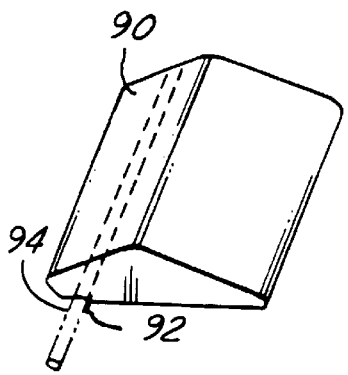
FIGS. 11 and 12 illustrate an embodiment of pawl members for use with another spring-type embodiment of the present invention.
Figure 12:
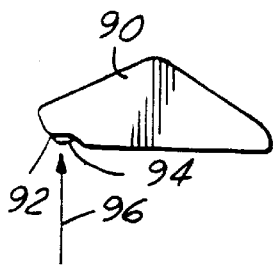
Figure 13:
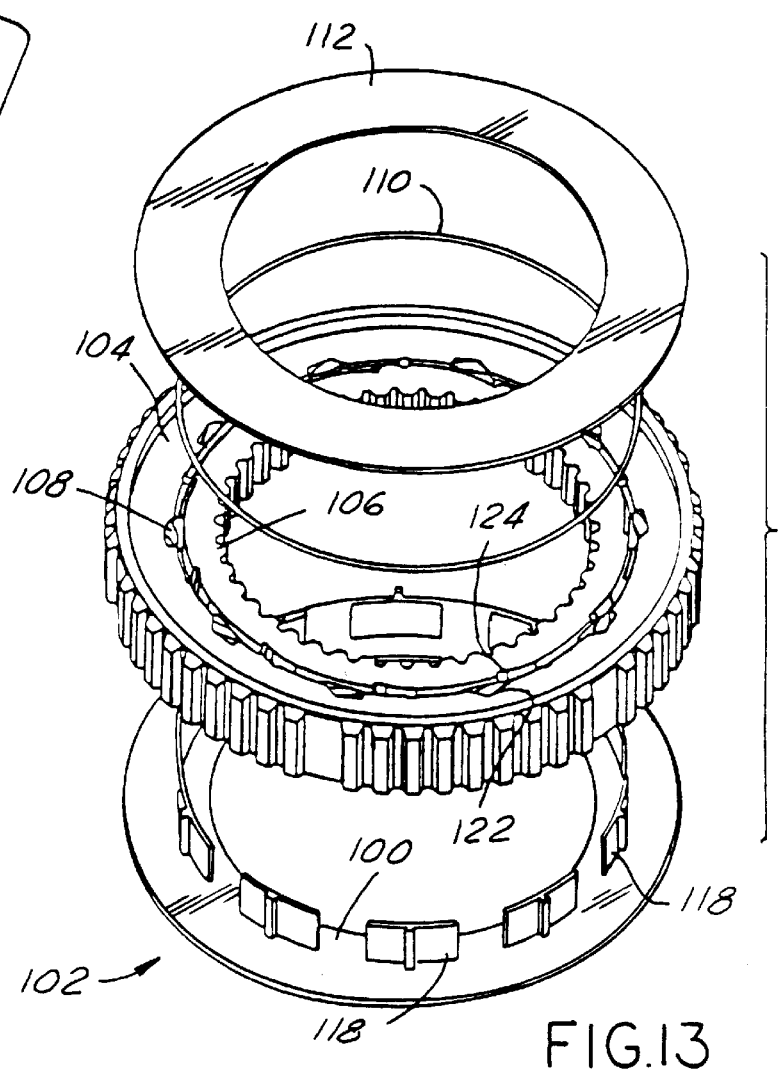
Figure 17:
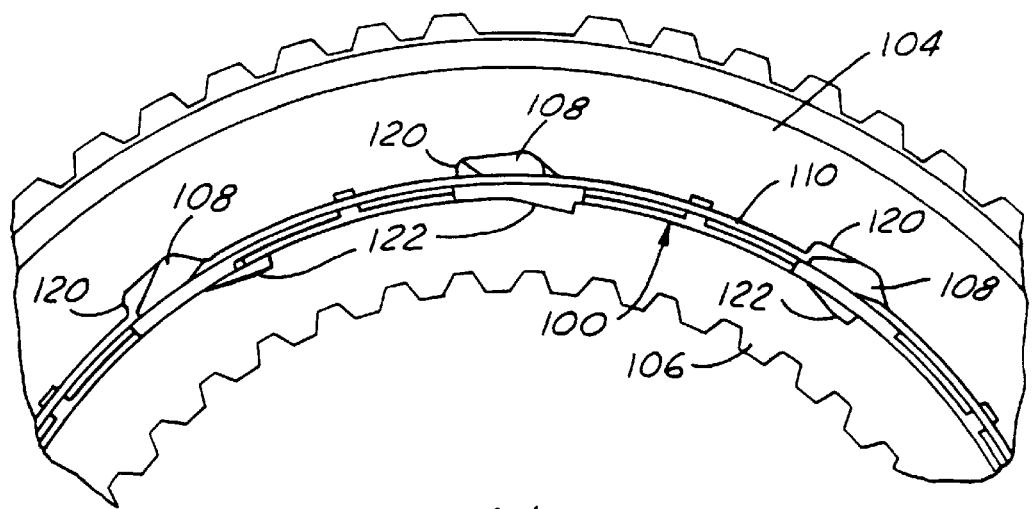
FIG. 17 is an enlarged view of a portion of the clutch assembly embodiment shown in FIG. 14.

The spring force on the pawl members can also be applied in another manner. As shown in FIGS. 11 and 12, the pawl member 90 has a longitudinally or axially extending groove 92. A small ribbon spring 94 is utilized to provide a spring force (SF) in the direction of arrow 96. The ribbon springs 94 are preferably cut from thin strips of spring steel material and are positioned in the grooves 92 in order to provide a force SF toward engagement of the pawl members 90.

The washers 62 and 64 are also known as axial retainment devices or members and can be used to improve or enhance the operation of the present invention. The members 62 and 64 retain the pawl members axially (longitudinally) in the clutch assemblies. The retainment members also hold the inner and outer races in axial alignment, while allowing free relative rotation. Moreover, the axial retainment members act as thrust bearings between the clutch assembly and external parts of the mechanism that are rotating relative to the clutch assembly and must carry an axial load through the assembly. Finally, the axial retainment members (washers) 62 and 64 can retain lubrication in the clutch assembly which is required to prevent excess wear of the pawl members.

The washers 62 and 64 can be connected to the outer race through a press-fit arrangement, staking, welding, or mechanical fastening in any conventional manner.

An injection molded plastic retainer (retainment) member can also be utilized. Such a member 100 is shown in FIGS. 13–17. In these Figures, the one-way ratchet clutch assembly is referred to generally by the reference numeral 102. Together with the retainer member 100, the assembly 102 includes an outer race member 104, an inner race member 106, a plurality of pawl members 108, a garter spring member 110 and a second retainer member 112.

In this regard, in the embodiment of the invention shown in FIGS. 13–17, the pawl members 108 can be of any of the types shown and described earlier. In addition, the pawl members 108 are contained in pockets 120 in the outer race member and engage notches 122 in the inner race member, in the same manner described above with reference to the other Figures.

The retaining member 100 has a plurality of flanges or upstanding arcuate-shaped guide members 118 situated to be positioned within the annular space between the inner and outer races 106 and 104, respectively. The member 100 is a radial bearing retainer for the pawls and the race members, and also acts as a lube dam for lubrication. The retainer members 100 and 112 are preferably attached together to retain the clutch assembly together axially. The retainer members also act as thrust bearings between the assembly and external parts of the mechanism that are rotating relative to the clutch assembly and carry axial loads through the assembly. The retainer members 100 and 112 can be connected together in any conventional manner, such as a press-fit arrangement, staking, ultrasonic welding, mechanical fastening, or the like. Preferably, the retainer member 100 is made from an injection molded plastic material, and also preferably has a low friction coefficient so that it can provide improved bearing performance over regular steel-on-steel bearings.

Figure 18:
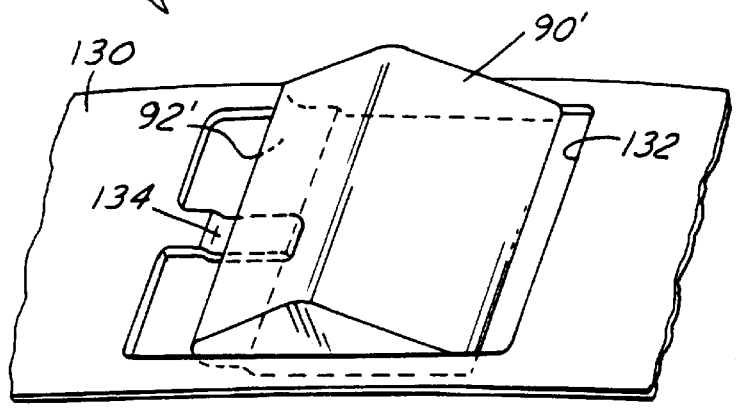
FIGS. 18 and 19 depict another ribbon spring embodiment of the present invention.
Figure 19:
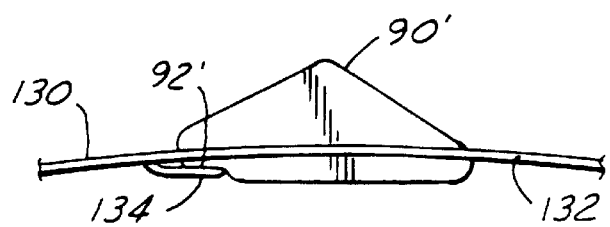

Another spring embodiment in accordance with the present invention is shown in FIGS. 18 and 19. In this embodiment, pawl members 90' are utilized which are the same as pawl members 90 described earlier. The members 90' have an axial groove 92'. A ribbon spring member 130 (a/k/a a "cage" member) has an annular circular shape and is adapted to fit between the inner and outer race members of the clutch assembly. The member 130 is preferably made of spring steel and has a plurality of openings or windows 132 (only one of which is shown), each with a tab member 134. The pawl members 90' are positioned in the openings 132 and the tab members are positioned in the grooves 92'. The ribbon spring member 130 through the tab members 134 provides biasing forces on each of the pawl members 90' in the clutch assembly toward engagement with the notches on the inner race member.

Figure 20:
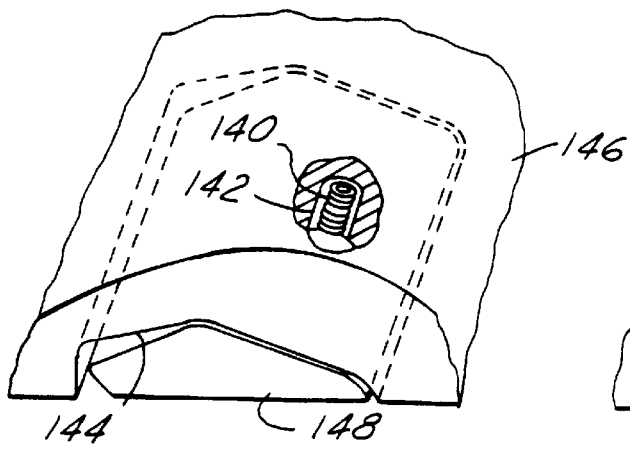
FIGS. 20 and 21 depict a coil spring embodiment in accordance with the present invention.
Figure 21:
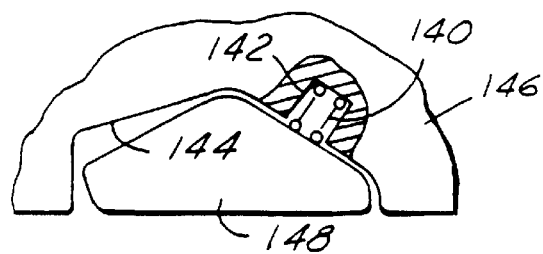

In accordance with the spirit and scope of the present invention, the spring mechanism for biasing the pawl members toward engagement with the inner race notches can have a wide variety of forms. Other than garter and ribbon springs described above, other spring members, such as coil springs, leaf springs, and the like could be utilized. In this regard, a coil spring embodiment is shown in FIGS. 20 and 21. One or more coil springs 140 are positioned in recesses or bores 142 which connect to pockets 144 in the outer race member 146. The coil springs 140 bias the pawl members 148 radially inwardly toward the inner race member.

Figure 22:
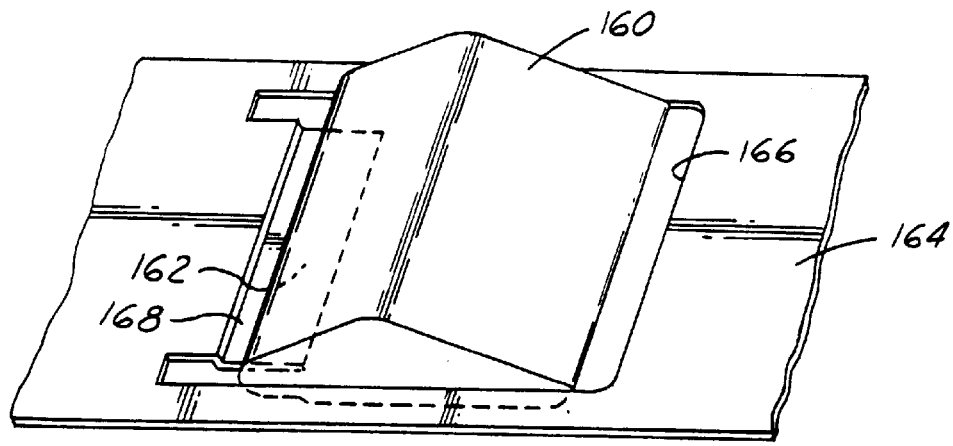
FIGS. 22–27 depict further embodiments of the invention which utilize other types and styles of spring members.
Figure 23:
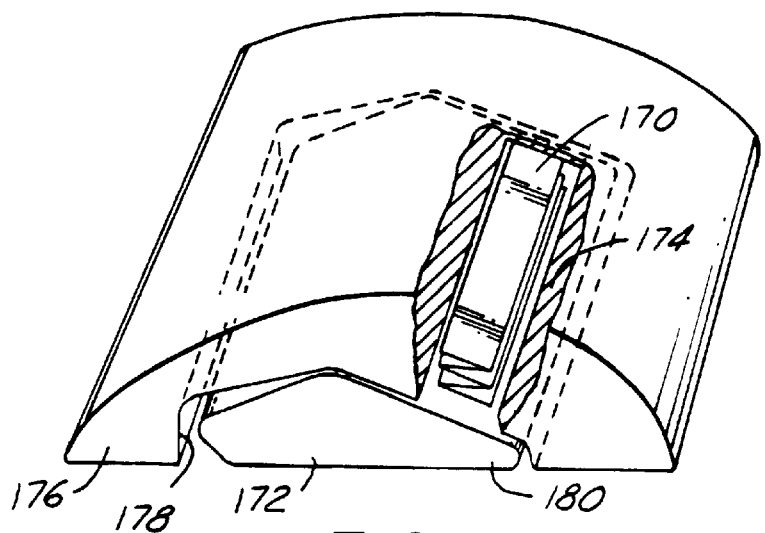
Figure 24:
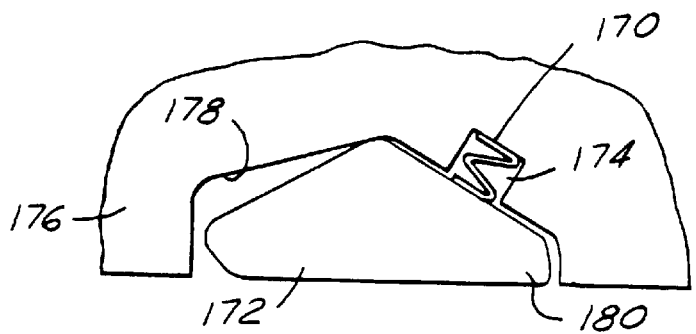

In the embodiments of the invention shown in FIGS. 22–24, the resilient biasing members extend across all or substantially all of the width of the pawl member. In FIG. 22 (which is related to the embodiment shown in FIGS. 18 and 19), the pawl members 160 have an axial groove 162. A ribbon-type spring member 164 has an annular shape and is adapted to fit between the inner and outer race members of the clutch assembly. The member 164 is preferably made of spring steel and has a plurality of openings or windows 166 (only one of which is shown), each with a spring tab member 168. The pawl members 160 are positioned in the openings 166 and the tab members 168 are positioned in the grooves 162. The ribbon spring member 164 through the spring tab members 168 provides biasing forces on each of the pawl members 160 in the clutch assembly toward engagement with the notches on the inner race member.

The spring tab member 168 is wider than the spring tab member 134 utilized with the embodiment shown in FIGS. 18 and 19. The wide spring tab member substantially reduces the rolling mode of rotation of the pawl member. As a result, the wide spring member prevents rattling of the pawl during the free wheeling mode of operation of the clutch assembly. Not only does the wide spring structure restrain the rolling mode of rotation, but it enhances fluid damping of the pawl members.

Another embodiment of the invention utilizing a wide spring member is shown in FIGS. 23 and 24. In this embodiment, a wide accordion-type (or "Z-spring") spring member 170 is located radially outwardly of the pawl member 172. The spring member 170 is positioned in a recess or pocket 174 in the outer race member 176 which connects with the pawl pocket 178. The spring member 170, which preferably is made from a spring steel or equivalent material, pushes the toe 180 of the pawl member 172 into engagement with the notches in the inner race member. The width of the spring member 170 restrains the rolling mode of rotation of the pawl member. Fluid and frictional damping are also obtained with this design. The width of the spring member 170 preferably is substantially the same as the width of the pawl member, although it can also be slightly shorter or even greater if space permits. For example, spring members two millimeters shorter than the width of the pawl members can be utilized.

Figure 25:
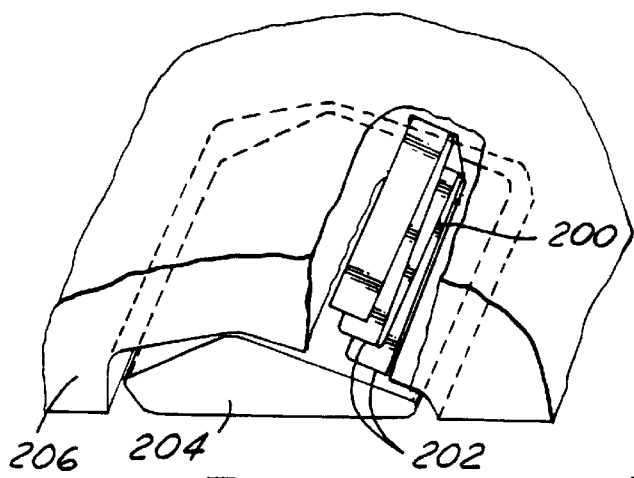
Figure 26:
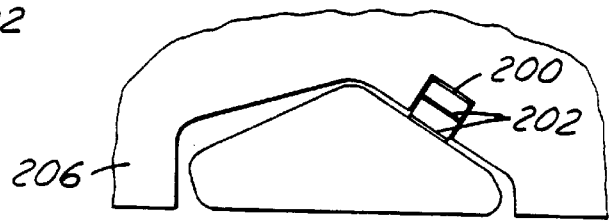
Figure 27:
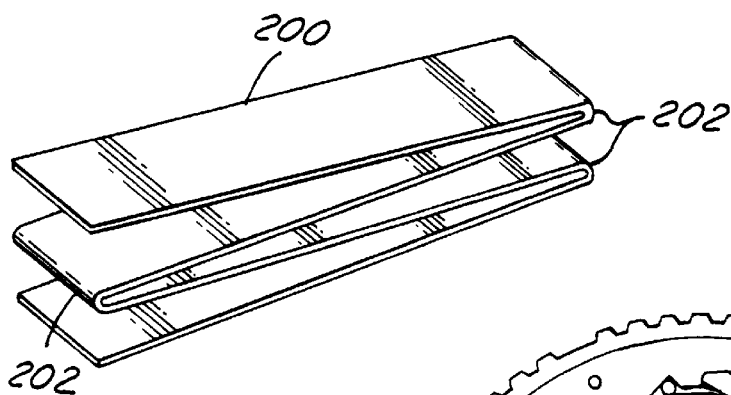
Figure 28:
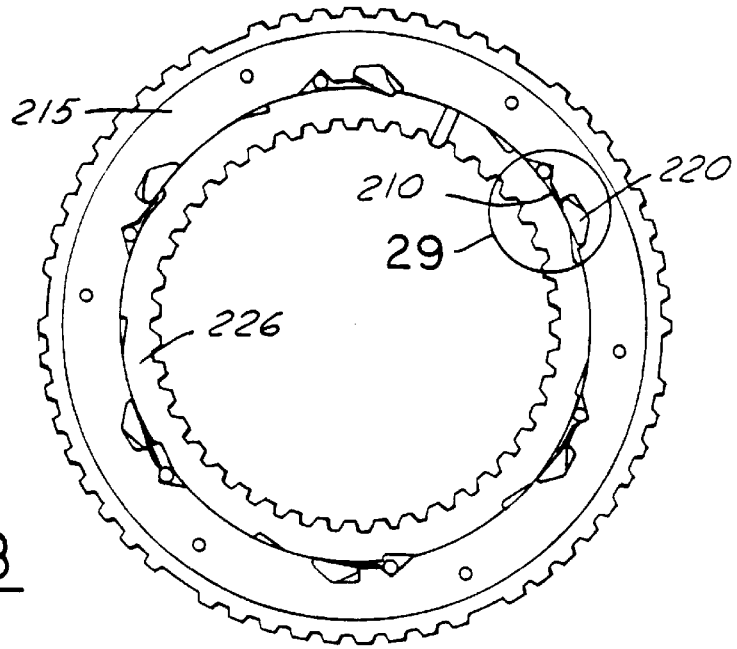
FIGS. 28–33A depict still further embodiments of the invention.
Figure 29:
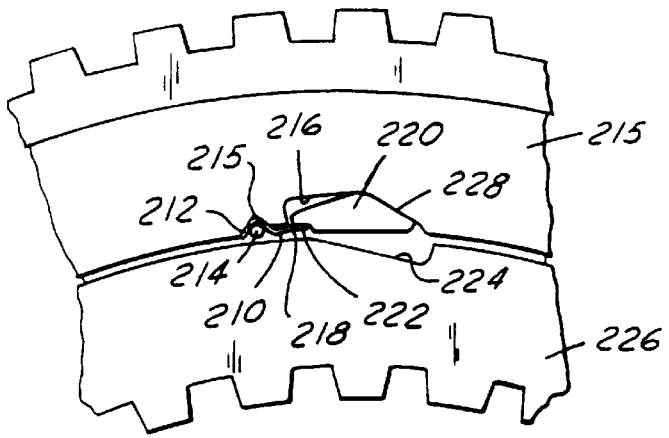
Figure 30:
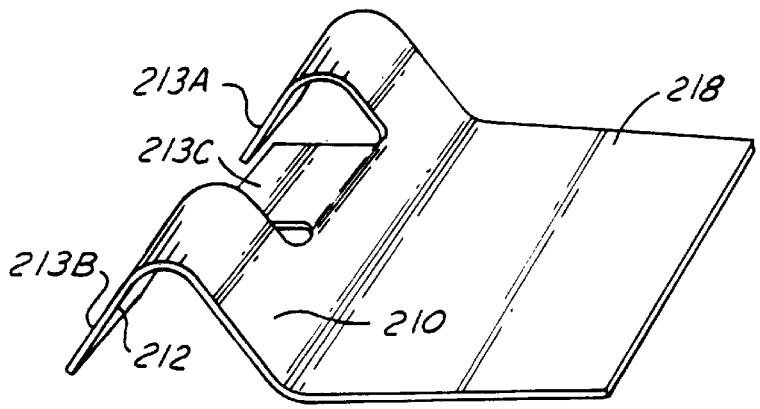
Figure 31A:
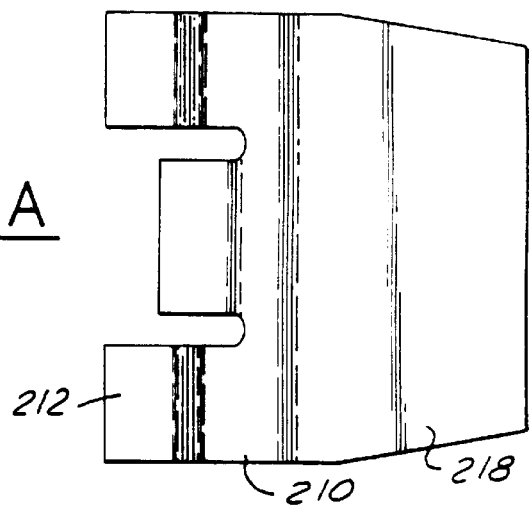
Figure 31B:
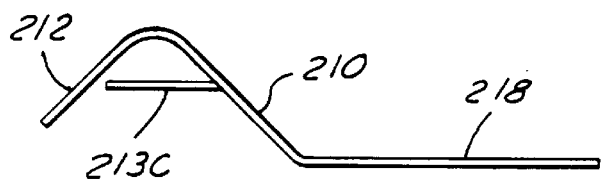
Figure 32:
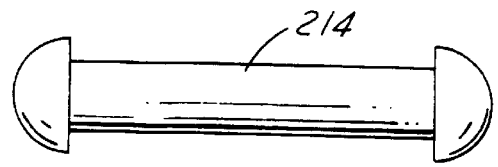

Another type of accordion or Z-type spring member 200 which can be used with the present invention is shown in FIGS. 25–27. The spring member 200 is made from a single piece of spring steel or equivalent material and is cut and folded in the manner depicted. With spring member 200, the folds 202 are oriented in the tangential (annular) direction (transverse to the axial direction of the clutch) with the folds on the ends being positioned adjacent the outer or side surfaces of the clutch race members.

The spring member 200 is used to bias the pawl member 204 in the outer race member 206 in a direction toward engagement with the notches in the inner race member. Preferably, the spring member 200 extends the entire width, or substantially the entire width, of the pawl member 204.

Another wide spring member 210 is shown in FIGS. 28–33. Spring member 210 is an individual spring member made of stainless steel (spring temper or high yield) and bent into the shape shown. The spring member 210 has an inverted V-shaped portion 212 which fits around a pin member or rivet 214 (see FIG. 32), which in turn is secured in ancillary pocket 215 adjacent the main pawl pocket 216 in outer race member 215. The flat flange portion 218 of spring member 210 fits under recessed portion 222 of pawl member 220 and acts to bias the pawl member into engagement with notches 224 in inner race member 226.

The V-shaped or arched portion of the spring member 210 has three "fingers" or spring tab members 213A, 213B and 213C. The two outer tab members 213A and 213B balance and hold the spring member 210 securely in position in the ancillary pocket 215, while central tab member 213C is biased against the pin member or rivet 214. This is shown more clearly in FIG. 33A. Lube dams or retainer members 219 are used to hold the pin member or rivet 214 in position. Retainer members 219 are preferably annular in shape and positioned on both sides of the clutch assembly.

Figure 33:
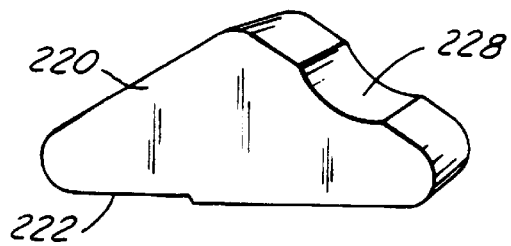
Figure 33A:
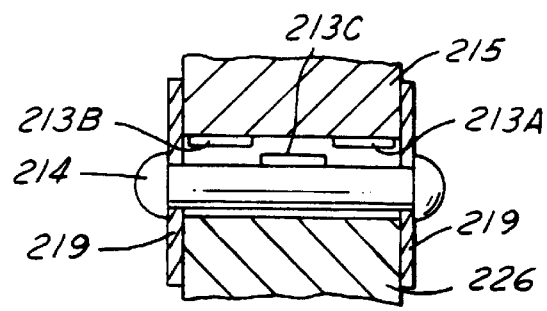

The pawl member 220 also has a recessed curved groove 228 on one surface (see FIG. 33). This helps prevent the pawl members from sticking to the inside surface of the pocket during operation.

The wide-type spring members of the types shown in FIGS. 22–33 can be placed in various locations in clutch assemblies, and can be used on various types of ratchet clutches, including conventional ratchet clutches, ratchet clutches with pivot ridges on the pawl members, and planar ratchet clutches. Further, if desired, separate inner and/or outer race members can be eliminated from the mechanical structure in which the clutch-type mechanism is utilized, and the pawl pockets and mating "lock-up" notches can be formed directly in the mating mechanical structural parts, such as a rotor or shaft.

FIGS. 34–42 depict a further embodiment of the present invention. This embodiment is referred to generally by the reference numeral 250 and utilizes a cage member 252 and separate spring members 254 and restrain the pawls 25 both axially and radially.

The cage member 252 is positioned between the inner race member 22 and the outer race member 24. The outer race member 24 has a plurality of pockets 26 in which the pawls 25 are positioned. A plurality of notches 28 are positioned in the outer circumference or periphery of the inner race member 22. The inner and outer race members, together with the pawl members 25 and the pockets and notches are the same as those features and members discussed above and do not need to be explained in more detail at this point. The operation of the inner and outer race members and the clutch assembly 250 itself is similar to the embodiments discussed above.

In this regard, the pawl members 25 have a pair of grooves or recesses 256 positioned on the two outer sides or edges thereof. The pawl members have a pair of flanges or "ears" 258 which extend above the grooves or recesses 256.

Figure 34:
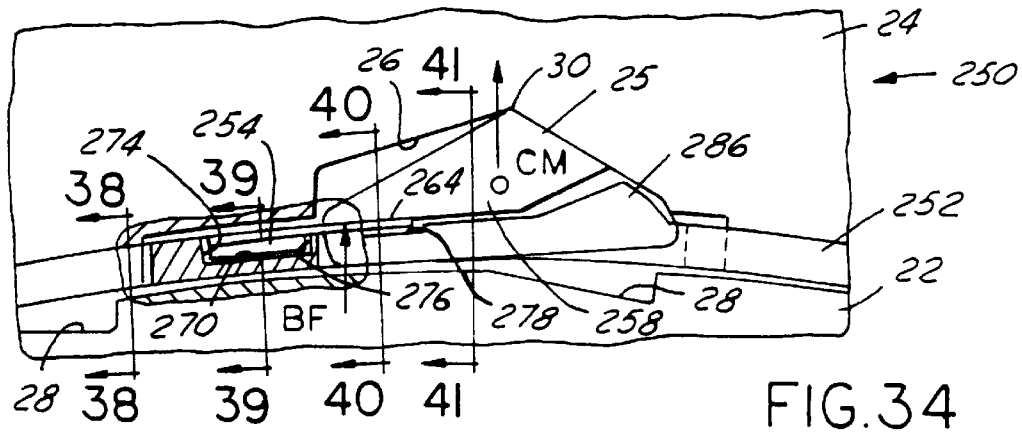
FIGS. 34–42 depict a still further embodiment of the invention which utilizes a cage member and separate spring member, and which restrains the pawls in the clutch assembly in an improved manner.
Figure 35:
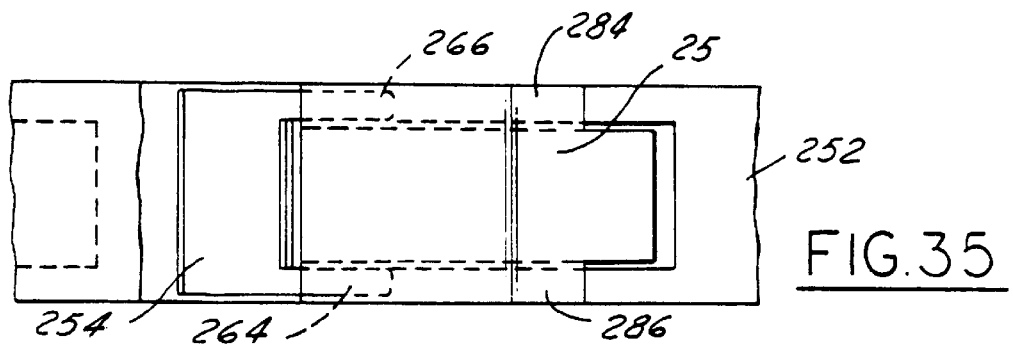
Figure 36:
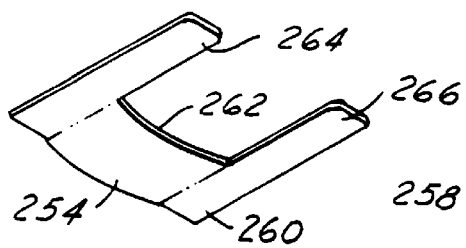
Figure 37:
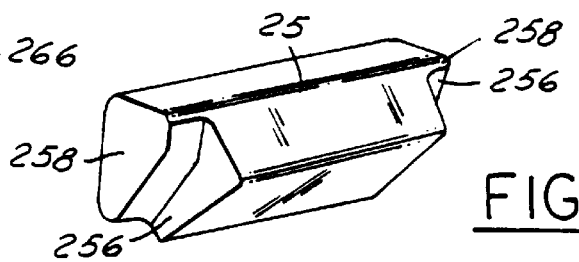
Figure 38:
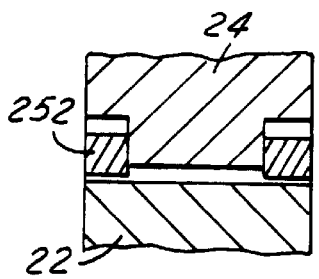
Figure 39:
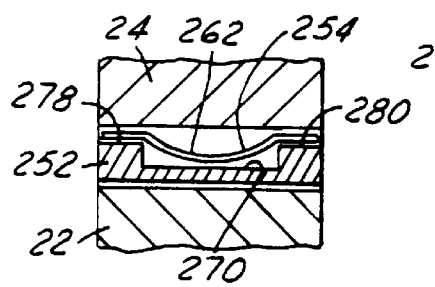
Figure 40:
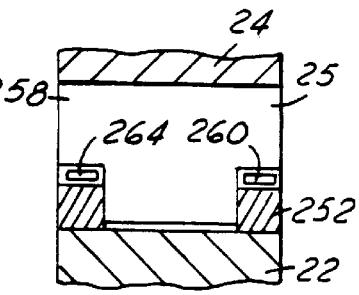
Figure 41:
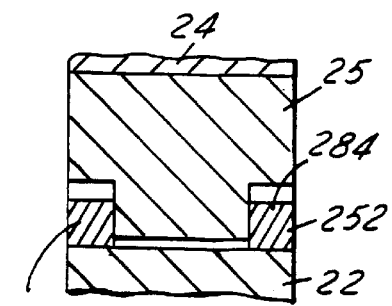
Figure 42:
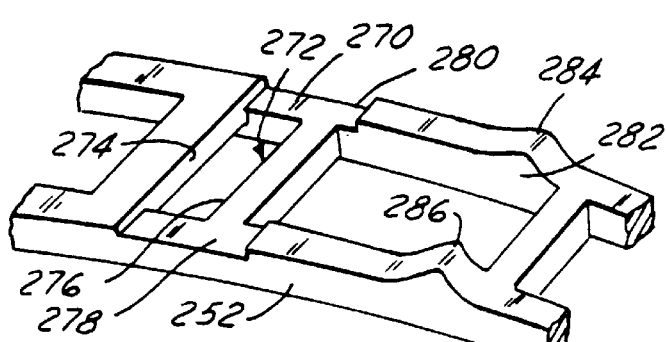

In FIGS. 34–42, FIG. 34 is an elevational view of a clutch assembly illustrating the various structures and features in their operational position, FIG. 35 is a top elevational view of the cage member 252 and spring member 254 with a pawl member 25 positioned therein. FIG. 36 illustrates spring member 254 while FIG. 37 illustrates the pawl member 25. FIGS. 38, 39, 40 and 41 are cross-sectional views taken along lines 38—38, 39—39, 40—40, and 41—41 in FIG. 34. Finally, FIG. 42 illustrates one portion of the cage member 52 depicting its features and structure.

The cage member 252 can be made of any of the conventional materials used with cage members for clutch assemblies today, but preferably is made from a plastic material. The spring member 254 is generally a U-shaped member as shown in FIG. 36 and made from a spring steel or similar material. The spring member 254 has a body portion 260 which have the curved middle section 262 and a pair of arm or spring tab members 264 and 266.

In use, the spring member 254 is positioned in a cutout or recessed area 270 on the cage member 252. This is best shown in FIGS. 34 and 42. The recessed area 270 has a central grove or opening 272, as well as a shoulder or stop member 274. When the spring member 252 is assembled with the cage member 252, the curved center portion 262 of the spring member is positioned in the opening 272 and held therein. In this regard, the center portion 262 is held between shoulder 274 and front edge 276 of opening 272.

The spring tab members 264 and 266 are positioned along the edges 278 and 280 of the groove 270 and are adapted to contact the ears 258 of the pawl members 25.

The pawl members 25 are positioned to fit within the opening 282 in the cage member 252. The side ridges 284 and 286 on the cage member are adapted to mate with the configuration of the grooves 256 and bottom surfaces of the ears 258 on the pawl members 25, as shown in FIGS. 34 and 37. This allows the pawl members to rotate from the free wheeling position to the engaged position.

Although only a portion of the cage member 252 is shown in FIGS. 34, 35, and 42, it is understood that the cage member 252 is annular in shape and has a similar structure and windows 282 for positioning each of the pawl members 25 around the circumferences of the inner and outer race members.

As shown in FIG. 34, the center of mass (CM) of the pawl members 25 are positioned relative to the pivot ridge 30 such that the pawl members are biased toward their engaged positions during use when the outer race is rotating.

The spring members 254, and in particular the spring tab members 264 and 266, apply biasing forces (BF), as shown in FIG. 34, on the pawl members 25 in a direction toward engagement of the pawl members with the notches 28 in the inner race member 22.

The embodiment of the invention shown in FIGS. 34–42 provide a clutch assembly which has pawl members which are biased toward the engaged position thus controlling the engaging force and providing a quick response of the clutch assembly to changes in rotation or direction of the race members. The cage member 252 also restrains the pawl members 25 both in the axial and radial directions. This also provides for a more accurate and faster response of the pawl members when necessary during operation of the clutch assembly.

Figure 43:
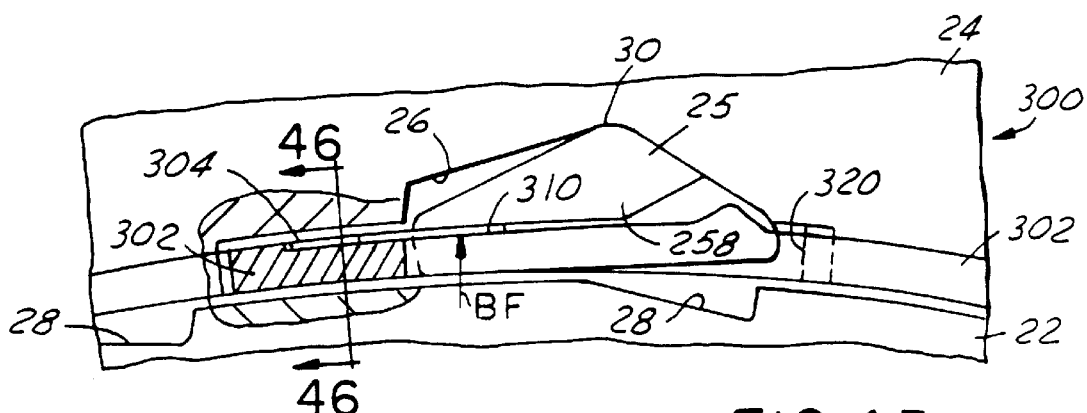
FIGS. 43–46 depict another embodiment of the invention which utilizes a cage member and separate spring members.
Figure 44:
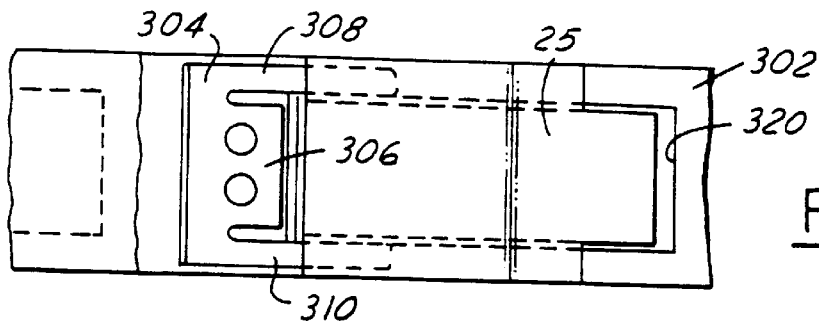
Figure 45:
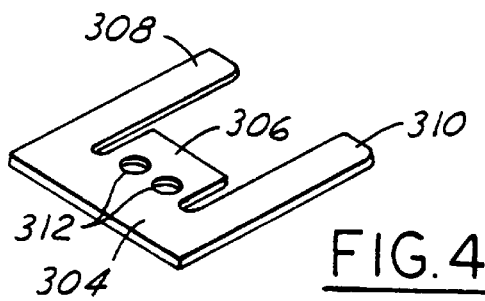
Figure 46:
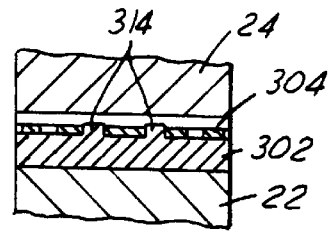

Another embodiment of the inventive clutch assembly is shown in FIGS. 43–46 and is referred to generally by the reference numeral 300. In these figures, FIG. 43 illustrates the assembly of the inner and outer race members 22 and 24, respectively, with the pawl members 25 and cage member 302. FIG. 44 is a top elevational view illustrating the assembly of the cage member 302, pawl member 25, and spring member 304, while FIG. 45 depicts the spring member 304 by itself. FIG. 46 is cross-sectional view of the assembly shown in FIG. 43, when taken along line 46—46 in FIG. 43.

In the embodiment clutch assembly 300, the spring members 304 are generally U-shaped with a central flange portion 306 and a pair of spring tab members 308 and 310 which are used to bias the pawl members 25 toward the engaged position. A pair of openings 312 are provided in the central flange member 306. The openings 312 are positioned on, and mate with, nubs or posts 314 provided on the cage member 302. The posts 314 as shown are provided integral with the cage member 302. The posts 314 also can be separate pin members secured to the cage member, or protrusions extending downwardly from the spring member 304 into holes or openings in the cage member (not shown). The cage member 302, posts 314, and spring member 304 can all be secured or fixed together in some manner, such as welding, heat staking, gluing, or the like.

The pawl members 25 are positioned in windows or openings 320 in the cage member 302 and the side flanges or ears 258 on the pawl members 25 are positioned to contact and be biased by the spring tab members 308 and 310. The cage member and outer race surface hold the pawl members securely in position and prevent "rattling" of the pawl members.

For assembly, the spring members 304 are staked or otherwise secured to the cage member 302. The pawl members 25 are then positioned on the cage member compressing the spring tab members 308 and 310. The subassembly comprising the pawl members, spring members and cage member is then assembled into the outer race member 24. The inner race member 22 is inserted into the center of the outer race member and subassembly. Finally, oil/lubrication dams or retainer members (not shown) are positioned on both sides of the clutch assembly and crimped or otherwise conventionally secured into position.

Figure 47:
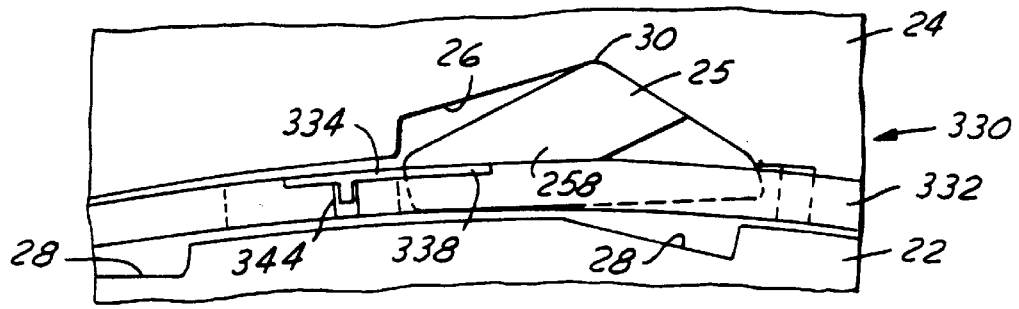
FIGS. 47–49 illustrate a further embodiment of the invention which utilizes a cage member and separate spring member.
Figure 48:
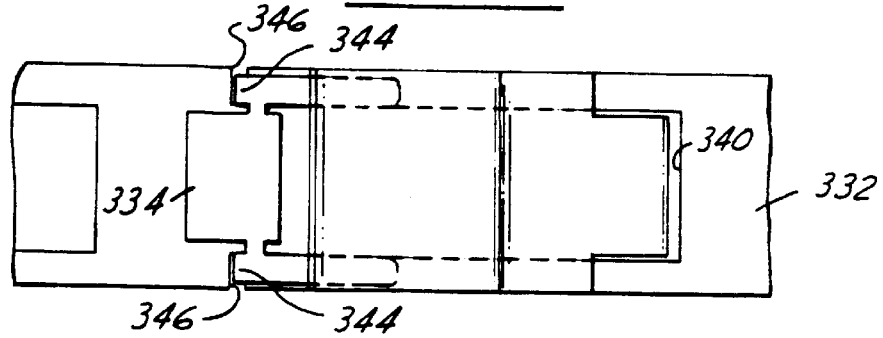
Figure 49:
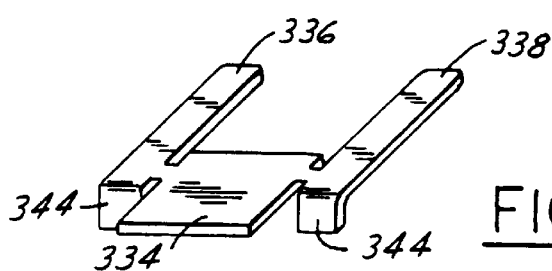

FIGS. 47, 48 and 49 illustrate still another embodiment of the present invention which utilizes a cage member and individual spring members to bias pawl members toward engagement. This embodiment is referred to by the reference numeral 330 and utilizes a cage member 332 and individual spring steel spring member 334. Spring member 334 has a pair of spring tab or arm members 336 and 338 which are used to contact the ears 258 of the pawl members 25 and thus bias the pawl members toward their engaged positions in the clutch assembly. The pawl members 25 are positioned in windows 340 in the cage member 332. The spring members 334 are secured to the cage member 332 in any conventional manner. Each of the spring members 334 also has a pair of downwardly extending flanges 334 which are adapted to mate within corresponding grooves or recesses 346 in the cage member 332. The interlocking engagement between the flanges 344 and the grooves 346 help retain the spring members 334 in their proper orientation and position in the clutch assembly 330.

The operation of the embodiments of the invention are referred to by reference numerals 250, 300 and 330 and as shown in FIGS. 34–42, 43–46, and 47–49 all operate in similar manners. The individual spring members are attached to or assembled with cage members which are positioned between the inner and outer race members. The spring members have arms or tab members which contact grooves in the pawl members and bias the pawl members toward the engaged positions. The pawl members have grooves and ears on the sides thereof which mate with the spring tab members on the spring members. The combination of cage members, spring members, and inner and outer race members restrain and position the pawl members in the axially and radial directions. These embodiments thus keep the pawl members in precise positions allowing them to be effective and immediately responsive to changes in rotation or direction of the race members.

Figure 50:
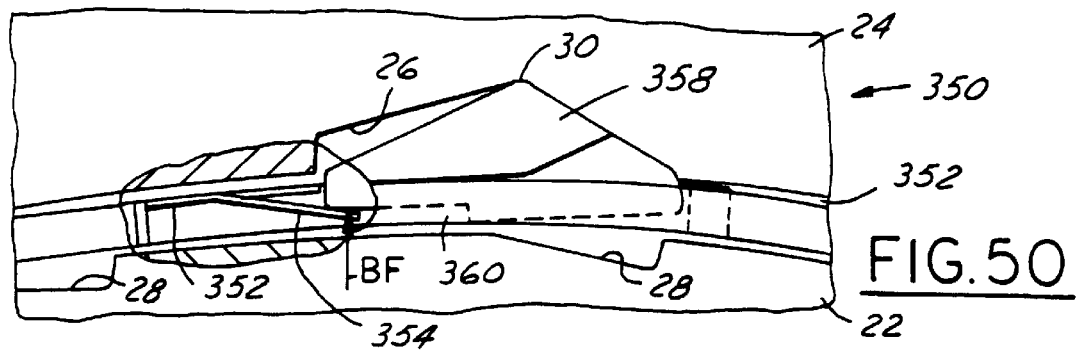
FIGS. 50–52 illustrate an embodiment of the invention which has a cage member having integral spring members thereon.
Figure 51:
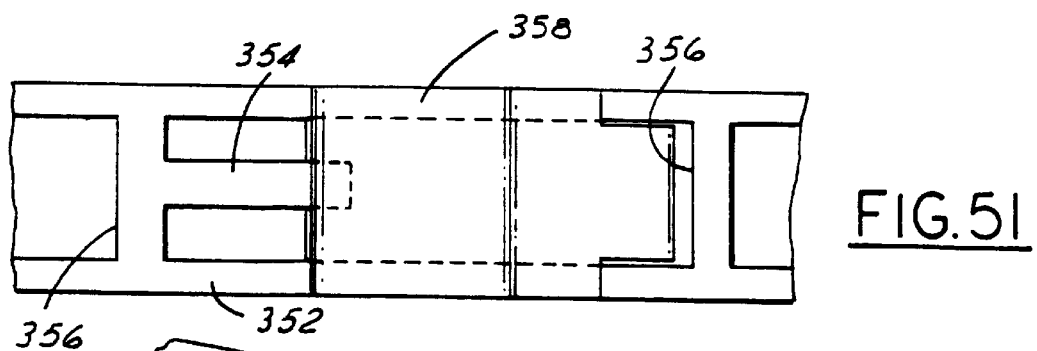
Figure 52:
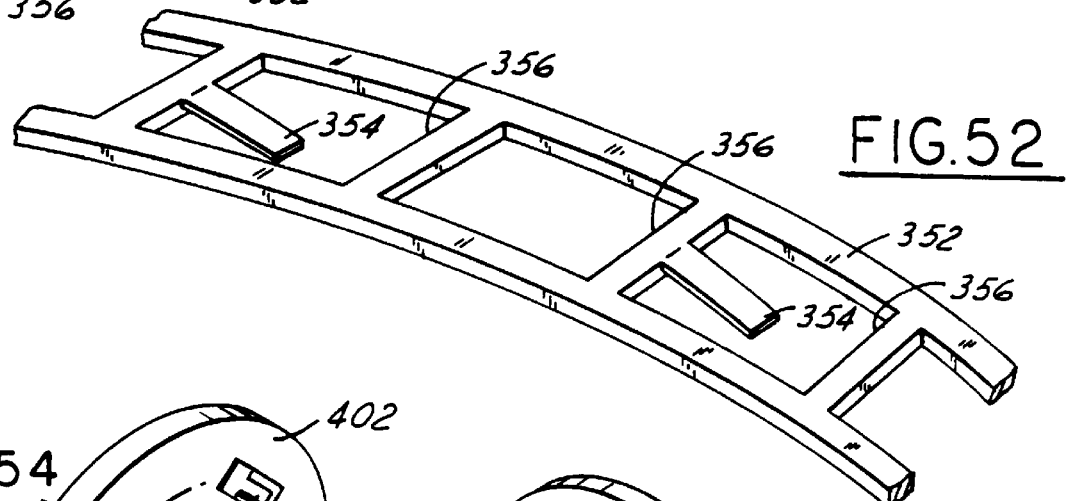

A still further embodiment of the present invention is shown in FIGS. 50–52. This embodiment is referred to generally by the reference numeral 350 and includes a cage member 352 which has integral spring tab members 354 directly integrally positioned thereon.

The cage members 352 is positioned between the inner and outer races 22 and 24, respectively, and have a plurality of windows 356 for positioning of the pawl members 358 therein. In this embodiment, the pawl members have an axial extending groove or recess 360 on the bottom surface thereof for mating with the spring tab members 354 on the cage member 352. As shown in FIG. 50, the tab members 354 provide a biasing force (BF) on the pawl members 358 in a direction toward engagement of the pawl members with the notches 28 in the inner race member 22.

Figure 53:
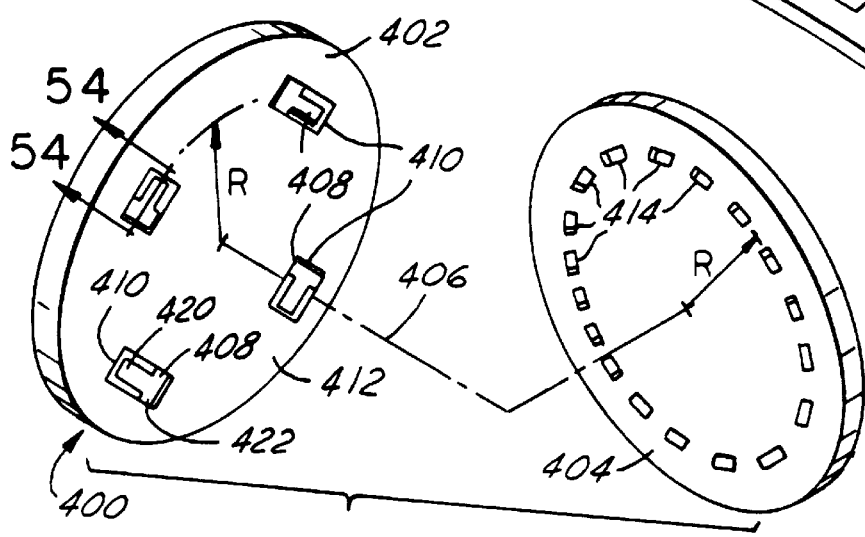
FIGS. 53–55 illustrate an embodiment of the invention utilized with a planar-type ratchet clutch mechanism.
Figure 54:
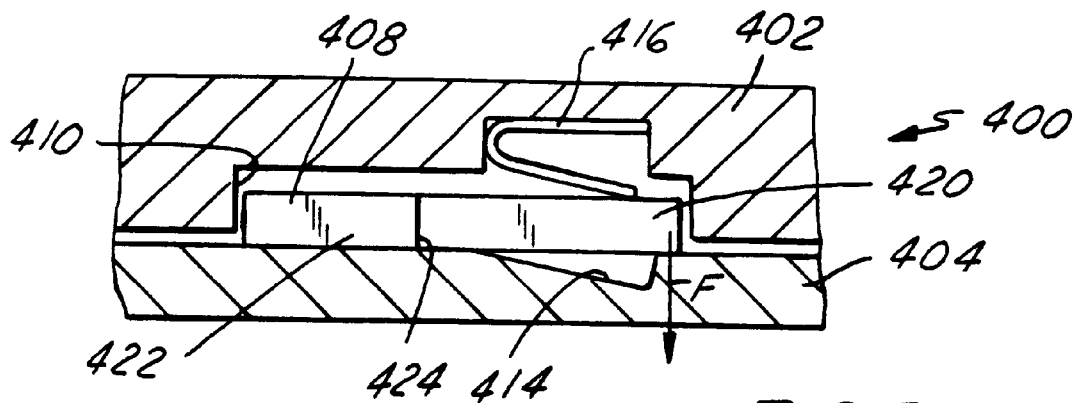
Figure 55:
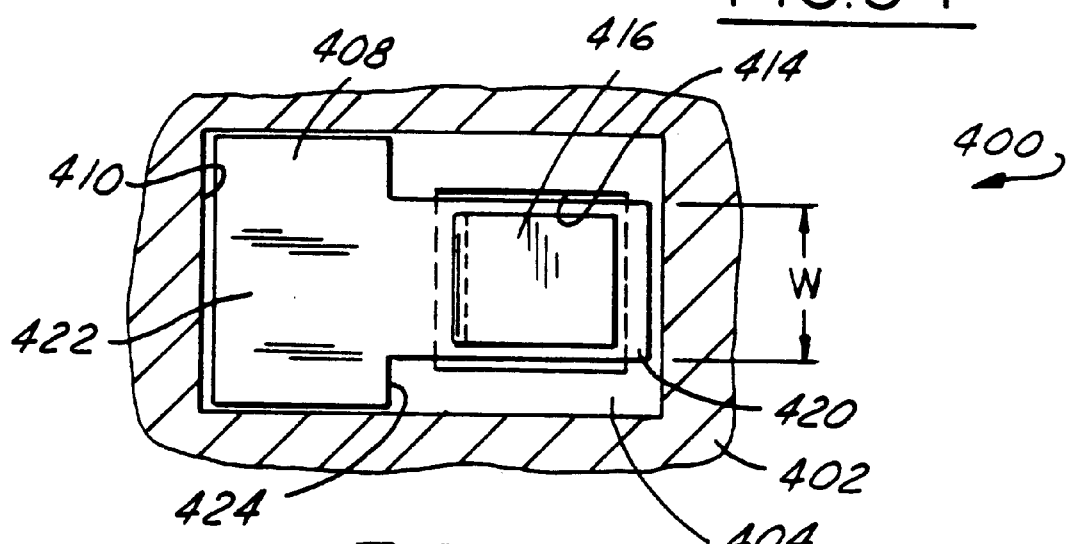

An embodiment of the invention utilized with a planar-type clutch assembly is shown in FIGS. 53–55 and referred to generally by the reference numeral 400. The planar clutch assembly includes a pair of mating rotor members 402 and 404. As conventionally known, the rotor members 402 and 404 are adapted to be rotated relative to one another around the same axis 406. One of the rotor members can be fixed or stationary, or both can be adapted to rotate, and in either direction.

A plurality of pawl members 408 are positioned in pockets 410 arranged in a circular pattern on the mating face 412 of rotor member 402. A plurality of notches 414 are provided on the corresponding mating face of rotor member 404. The notches 414 are also positioned in a circular pattern and at a radius or locus corresponding to the radius or locus of the circular position of pockets 410 on member 402.

Each of the pawl members 408 are biased toward engagement with the notches 414 by spring members 416. The forces from the spring members on the pawl members bias the ends of the pawl members in the direction "F" shown by the arrow in FIG. 54. The spring members 416 can be small thin steel leaf springs as shown in FIGS. 54–55, or they can be any other type of biasing or spring members which will perform the same or similar function. For example, several of the spring members disclosed above could be utilized for this purpose, such as the Z-shaped spring members, vertically oriented coil members, and the like. The spring member utilized should also be sufficiently wide to bias the pawl members substantially across their axial widths in order to provide optimum engagement action and performance (in the manner discussed above).

The pawl members 408 preferably are "T-shaped", as shown in FIGS. 53 and 55, with a narrower engaging or locking end portion 420, and a larger opposite end 422. The mating notches 414 in rotor member 404 have a width "W" (shown in FIG. 55) which permit entry of the smaller engaging ends 420 of the pawl members, but not the larger ends 422. In this manner during use, the pawl members pivot around the corner edges 424 of the larger ends.

While the best modes for carrying out the present invention have been described in detail herein, those familiar with the art to which this invention relates will recognize various alternate designs and embodiments for practicing the invention as defined by the following claims. All of these embodiments and variations that come within the scope and meaning of the present claims are included within the scope of the present invention.

What is claimed is:

1. A one-way ratchet clutch assembly comprising:
    an outer race member having a plurality of pockets;
    an inner race member having a plurality of notches;
    a plurality of pawl members, one of said pawl members positioned freely in each of said pockets;
    a cage member positioned between said inner and outer race members;
    said pawl members each having a ridge thereon and said pockets each having a corresponding recess for mating with said ridge;
    said cage member having a plurality of biasing members for biasing said pawl members toward engagement with said notches in said inner race member.

2. The one-way ratchet clutch assembly of claim 1 wherein a number of notches are provided which is different in number than the number of pawl members.

3. The one-way ratchet clutch assembly of claim 1 wherein said biasing members comprise a plurality of spring members secured to said cage member.

4. The one-way ratchet clutch assembly of claim 3 wherein said pawl members have at least one groove thereon and said spring members have at least one spring tab member thereon which is positioned in said groove.

5. The one-way ratchet clutch assembly of claim 4 wherein said biasing member comprises a spring member positioned in operative engagement with each of said pawl members.

6. The one-way ratchet clutch assembly of claim 4 wherein said spring member is a U-shaped spring steel member with a pair of spring tab members for providing a biasing force on said pawl member.

7. The one-way ratchet clutch assembly of claim 1 wherein said cage member retains said pawl members in the axial and radial directions.

8. A one-way ratchet clutch assembly comprising:
    an outer race member having a plurality of pockets;
    an inner race member having a plurality of notches;
    a plurality of pawl members, one of said pawl members being positioned freely in each of said pockets;
    said pawl members being retained in said pockets during rotation of one of said race members in one direction relative to the other of said race members, and at least one of said pawl members being engaged with one of said notches when said race members are rotated relative to each other in the opposite direction; and
    a cage member having at least two spring tab members for directing said pawl members toward engagement with said notches.

9. The one-way ratchet clutch assembly of claim 8 wherein said pawl members each have a groove for operatively mating with said spring tab members.

10. The one-way ratchet clutch assembly of claim 8 wherein said pawl members each have two circumferentially extending grooves for positioning of said two spring tab members.

11. A one-way ratchet clutch assembly comprising:
    an outer race member having a plurality of pockets;
    an inner race member having a plurality of notches;
    a cage member positioned between said inner and outer race member;
    a plurality of spring members positioned between said inner and outer race members; and
    a plurality of pawl members, one of said pawl members positioned in each of said pockets;
    said cage member having a plurality of windows;
    one of said pawl members positioned in each of said windows;

said spring members each having at least one tab member biasing a respective pawl member toward engagement with said notches in said inner race;

said cage member retaining said pawl members in the axial and radial directions.

12. A one-way planar ratchet clutch assembly comprising:

a first rotor member with a plurality of pockets therein;

a second rotor member with a plurality of notches therein;

pawl members positioned in each of said plurality of pockets, each of said pawl members having an axial width dimension; and leaf spring members in contact with each of said pawl members biasing said pawl members substantially across said width dimension toward engagement with said notches.

13. A one-way planar ratchet clutch assembly comprising:

a first rotor member with a plurality of pockets therein;

a second rotor member with a plurality of notches therein;

pawl members positioned in each of said plurality of pockets, said pawl members having a T-shaped configuration with a smaller end and a larger end; and leaf spring members in contact with each of said pawl members biasing said pawl members toward engagement with said notches.

14. The one-way ratchet clutch assembly of claim 13 wherein said notches in said second rotor member have a size to accommodate said smaller end of said T-shaped pawl members but not said larger end.

\* \* \* \* \*